United States Patent [19]

Ludlow et al.

[11] 4,182,046

[45] Jan. 8, 1980

[54] ELECTRONIC LEVEL AND PROTRACTOR

[76] Inventors: Roger D. Ludlow, 1193 Crestline Dr., San Jose, Calif. 95129; Charles M. Rieker, 1145 Laureles Dr., Los Altos, Calif. 94022

[21] Appl. No.: 911,987

[22] Filed: Jun. 2, 1978

[51] Int. Cl.² .................................................. G01C 9/06
[52] U.S. Cl. ............................................................. 33/366
[58] Field of Search ............................................. 33/366

[56] References Cited

U.S. PATENT DOCUMENTS

| | | | |
|---|---|---|---|
| 2,511,525 | 6/1950 | Bradwell et al. | 33/366 |
| 2,713,727 | 7/1955 | Balsam | 33/366 |
| 3,371,424 | 3/1968 | Sweet | 33/366 |
| 3,822,944 | 7/1974 | Hopkins et al. | 33/366 X |
| 3,861,052 | 1/1975 | Siegfried | 33/366 |

*Primary Examiner*—Charles E. Phillips
*Attorney, Agent, or Firm*—C. Michael Zimmerman

[57] ABSTRACT

An electrically responsive level of the type used for determining inclination with respect to a gravity field is described. The instrument relies for its operation on a bubble-within-a-vial type of inclination sensor. The vial is generally rectangular in cross-section, and its dimensions and the size of the bubble therewithin are selected to assure that the instrument can be used reliably in the field without false readings and the like. The specific leveling instrument described is of the so-called carpenter's type and is usable not only to provide a visual and/or audio indication of a level condition, but also to measure or establish any inclination between the horizontal and vertical.

11 Claims, 8 Drawing Figures

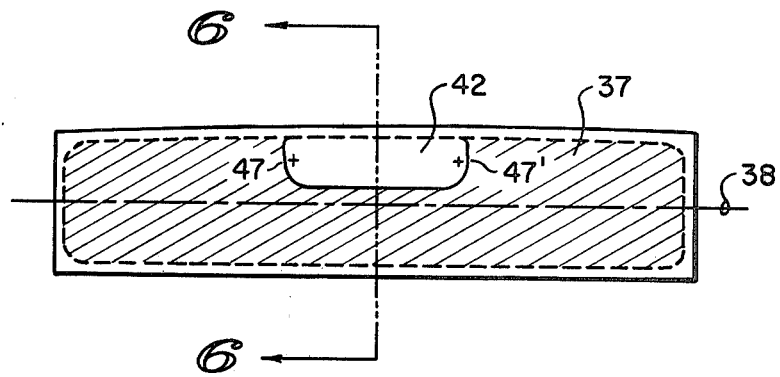
FIG. 5
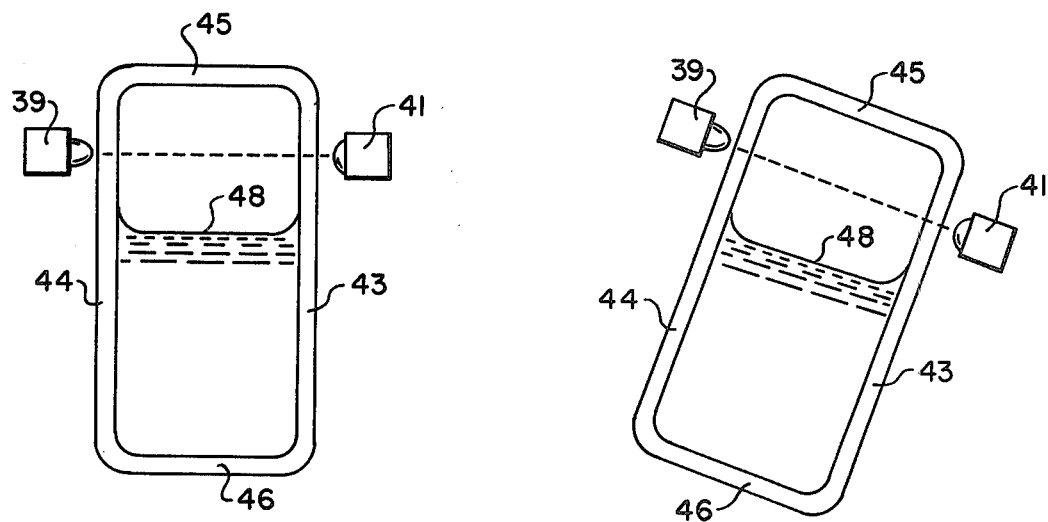
FIG. 6
FIG. 7

ELECTRONIC LEVEL AND PROTRACTOR

BACKGROUND OF THE INVENTION

The present invention relates to leveling instruments of the type used for determining inclination with respect to a gravity field and, more particularly, to such an instrument which responds electrically to inclinations and relies for its operation on detection of the position of a bubble within a vial.

The desirability of a leveling device which produces an electrical output indicative of its inclination with respect to a gravity field, has been recognized for some time. The electrical output of such an electronic level can be used, for example, to energize lamps, audio devices, etc., as a signal of the achievement of a desired inclination. Such an electrical output can also be used in a feedback arrangement to cause the inclination of a structure to be changed automatically to coincide with a desired inclination.

It has been proposed in the past that such an instrument which responds electrically include a pendulum for sensing inclination with respect to a gravity field. U.S. Pat. Nos. 723,526; 3,233,235 and 3,861,052 describe exemplary instruments of this type. Such instruments, however, are generally complex and fairly delicate. Moreover, they typically are not very sensitive or accurate in view of the resistance to pendulum movement provided by the pendulum mounting, and the fact that as a practical matter a substantial "swing" of the pendulum is required before its movement can be detected.

In view of the problems inherent in pendulum type electronic levels, most of those working in the field have turned to the common bubble-within-a-vial arrangement in an effort to provide satisfactory sensing of inclination. A vial indicator has the advantage of being quite simple, and the position of the bubble can be detected relatively easily with optical radiation. In this connection, the term "optical radiation" as used herein is meant to encompass not only electromagnetic radiation in the visible spectrum, but also that radiation adjacent thereto in the spectrum, such as infrared and near ultra-violet radiation, having basically the same transmission properties as visible radiation. Vial indicators have the additional advantage of providing a faster response to changes of attitude than most pendulum arrangements Examples of electronic levels relying on the detection of the location of a bubble within a vial by optical radiation can be found in U.S. Pat. Nos. 2,252,727; 3,324,564; and 3,371,424.

There are problems associated with bubble vial electronic levels, however, which have prevented the same from being accepted to any great degree. One problem has to do with their sensitivity. To obtain adequate optical radiation variations, most of such devices rely on the reflection, refraction, or absorption of radiation by the meniscus of the bubble. Such arrangements are extremely sensitive to even the slightest mechanical shock or vibration since any surface change at the bubble meniscus will affect the light. Thus, false alarms or readings can be common. Moreover, tipping of a bubble vial electronic level in a direction different than that whose inclination is to be measured can result in false readings. That is, the bubble configuration and movement is sensitive to the orientation of the instrument in all directions with respect to the gravity field, even though typically it is inclination only in one direction which is to be monitored or measured. Again, erroneous readings can result.

SUMMARY OF THE INVENTION

The present invention provides a bubble-within-a-vial electronic level which is sufficiently rugged for field use and is capable of being tipped in directions different from that being measured without providing erroneous readings with respect to the direction of interest. The invention accomplishes this by controlling the bubble in the vial so that changes in its position in the vial and in its configuration generally are not detected unless they are representative of the inclination of interest. That is, from the broad standpoint, the vial is designed to produce and maintain a desired bubble configuration by constraining the bubble between opposed side walls with substantially all of each opposed side of the bubble being defined by an associated one of such side walls. The result is that a major portion of the ends of the bubble defined by liquid extend generally in an approximate straight line parallel to the lines of the gravity field. This is in contrast, for example, to the end configuration of a bubble formed in a tubular vial having a circular cross section. The ends of such a bubble typically are curved throughout their entire length and do not exhibit an approximate straight-line profile parallel to the lines of the gravity field. As will become clear hereinafter, the bubble shape resulting from the particular construction of the vial of applicants' arrangement markedly reduces the tendency of undesired radiation interception by the liquid causing erroneous readings.

Also, the configuration of the vial in applicants' instrument, relative to the placement of the optical radiation detectors, is most desirably selected to space the optical radiation transmitted through the bubble a significant distance above the "floor" of the bubble, i.e., the bottom portion of the bubble defined by liquid. When this feature is coupled with the ends of the bubble being essentially parallel to the lines of the gravity field, any tipping of the instrument in a direction having a component orthogonal to the direction of the inclination to be measured does not result in liquid within the vial intercepting the radiation and causing false readings.

As another feature of the invention, the vial is dimensioned relative to the dimensions of the bubble so that the distance between the vial side walls is less than one-third the natural diameter (to be defined hereinafter) of the bubble. This dimensional relationship is important in assuring that when the instrument is tipped in a direction having a component orthogonal to the direction of inclination to be measured, the changes to the bubble configuration which might cause a lengthening or shortening of the same, will be minimized. Thus, erroneous readings which might be caused by such undesired bubble configuration changes are also minimized.

The invention also includes a particular optical detection arrangement and circuit therefor which has been found to be especially effective for providing the desired electrical response with a vial having a configuration as described. The invention also includes other features and advantages which will be described or will become apparent from the following more detailed description of a preferred embodiment incorporating the best mode contemplated by the inventors of carrying out the invention. The preferred embodiment also includes other features and advantages which when combined with the basic inventive concept result in an especially effective instrument which responds electrically to inclinations with respect to a gravity field.

BRIEF DESCRIPTION OF THE DRAWINGS

With reference to the accompanying three sheets of drawing:

FIG. 5 is an enlarged sectional view of a preferred embodiment of the vial incorporated in the invention illustrating the configuration of the bubble therein;

FIG. 6 is an enlargement of a sectional view of the vial of FIG. 5 taken on a plane indicated by the line 6—6 in FIG. 5;

FIG. 7 is a view similar to FIG. 6 but showing the relationship of the sensing means to the liquid within the vial forming the bubble when the level is tipped in a direction orthogonal to the direction of the desired inclination measurement.

DETAILED DESCRIPTION OF THE PREFERRED EMBODIMENT

Figure 1:
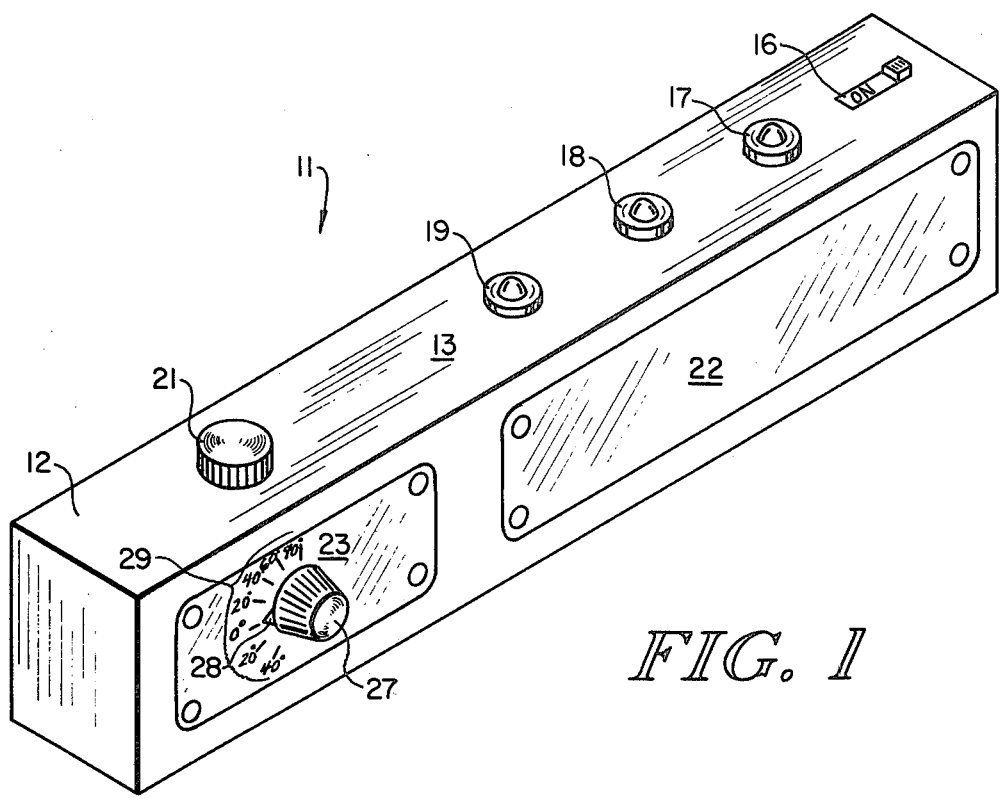
FIG. 1 is an isometric view of a preferred embodiment of an electronic level incorporating the invention.

With reference first to FIGS. 1-4, the preferred embodiment of an electronic level of the type used to measure inclinations is generally referred to by the reference numeral 11. Level 11 includes an elongated frame 12 having top and bottom walls defining flat exposed surfaces 13 and 14, respectively. Protruding from the surface 13 is an electrical on-off switch 16 and three indicator lamps 17, 18, and 19. The knurled head of a set screw or bolt 21, the purpose of which is to be described below, also protrudes from the frame upper surface 13.

The front side of the instrument 11 includes cover plates 22 and 23 closing two cavities 24 and 26 in the frame, housing various components of the instrument. As illustrated, a rotatable pointer knob 27 having a pointer 28 is alignable with an angle indicia scale 29 on the plate 23 to indicate various angles. As will become clear hereinafter, set screw 21 and the pointer knob and indicia arrangement described immediately above are part of an angle selection means which may be adjusted to allow the instrument 11 to measure or establish any desired angle with respect to the horizontal.

Indicator lamps 17, 18 and 19 are used to provide a visual indication of the angular relationship of the instrument 11 to a desired inclination. For example, energization of lamp 17 can indicate that the right end of the instrument (as viewed in the drawing) is higher than a desired inclination, whereas energization of lamp 19 can provide an indication that the left end of the instrument is higher than such inclination. Center lamp 18 can be energized by the circuitry to be described to indicate visually that the instrument is at the desired inclination. Lamps 17, 18 and 19 may be, for example, visible light emitting diodes, and may be of different colors, to aid in distinguishing between the same.

Figure 2:
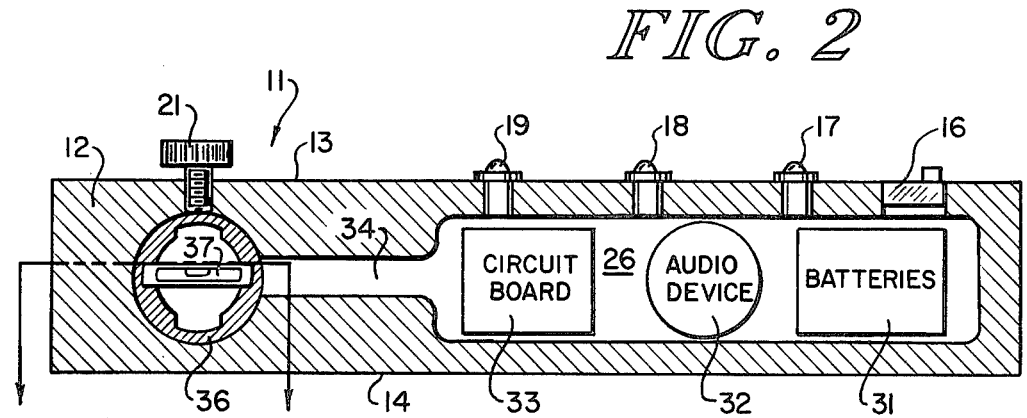
FIG. 2 is a schematic, sectional view of the electronic level of FIG. 1.

As can be seen from FIG. 2, a power supply in the form of a battery package 31 is housed within frame cavity 26, along with an audio display device (horn) 32, and a logic circuit board 33. For simplicity the various electrical connections between the parts are not shown in FIG. 2. However, frame 12 also defines a wire raceway 34 connecting the cavity 26 with cavity 24. The inner peripheral surface of cavity 24 is cylindrical and acts as a bearing surface for an annular mount 36 to which a liquid vial 37 and a bubble position sensing arrangement is secured. Vial 37, to be described in more detail hereinafter, is mounted in a fixed relationship on mount 36 for rotation therewithin frame cavity 24.

Figure 4:
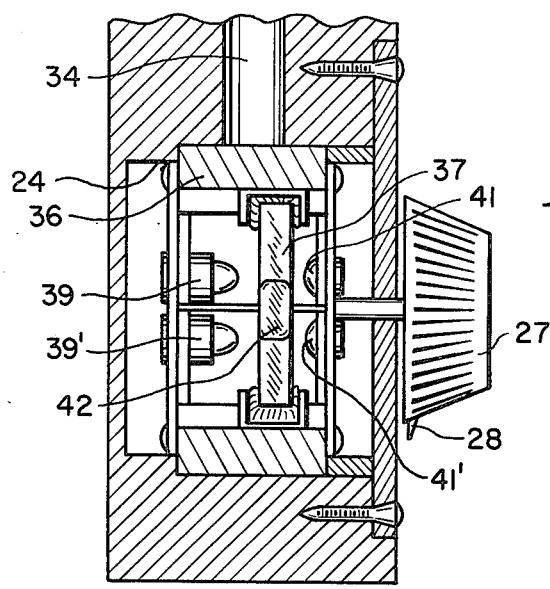
FIG. 4 is an enlarged, sectional view of the electronic level of FIG. 1, taken on a plane indicated by the lines 4—4 in FIG. 2, illustrating the vial and bubble sensing aspects of the level.

When the longitudinal axis 38 (FIG. 5) of the vial is parallel to an imaginary line (hereinafter, the first reference axis) lying in the plane of bottom surface 14 of the frame, the pointer 28 on knob 27, which knob is secured to the annular mount 36 as seen in FIG. 4, is aligned with the zero degree mark of scale 29, and when the bubble is centered in the vial, the instrument will indicate a "vial level" condition. Thus, when the bottom surface 14 of the frame is positioned so that the first reference axis is exactly horizontal, the bubble will be centered and the instrument will display a "vial level" condition. As mentioned previously, pointer 28 is aligned at such time with the zero degree mark on scale 29, thereby indicating that the instrument surface 14 and any other surface upon which it is resting contains the first reference axis which has a 0° deviation from the horizontal, i.e., it is perpendicular to lines defining the Earth's gravity field.

Figure 3:
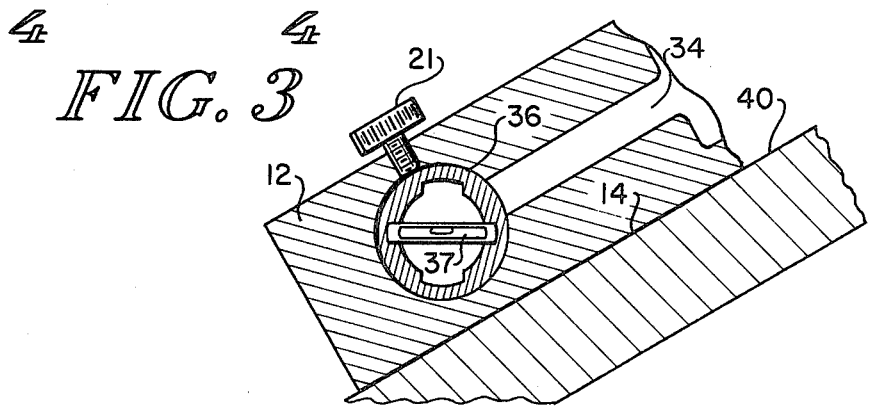
FIG. 3 is a partial schematic sectional view of the level of FIG. 1, illustrating a differing relationship of the parts shown in the comparable portion of FIG. 2.

Instrument 11 can also be used to establish or measure an inclination between the horizontal and vertical. More particularly, to establish a desired inclination other than zero, the knob 27 is rotated to thereby rotate annular mount 36 within the frame 12 and change the angular relationship of the vial axis 38 to the reference axis defined by the surface 14. Pointer 28 and scale 29 are so related to one another that they provide a visual indication of the angle at any given time between such reference axis and the vial longitudinal axis 38. Thus, pointer 28 will indicate the angular deviation of the reference axis from the horizontal when the instrument indicates a "vial level" condition. The instrument can therefore be used as shown in FIG. 3 to establish or measure the angular deviation of a surface 40, for example, from the horizontal. If desired, set screw 21 can be tightened to lock annular mount 36 in a desired angular setting with respect to the frame 12, to aid in use of the instrument to establish a particular angle a multiplicity of times. When the instrument is being used as a protractor, i.e., to measure an angle already established, it is only necessary to rotate the knob 27 until such time as a "vial level" condition is indicated, and then check the angular relationship indicated on scale 29 by pointer 28 to obtain the desired information.

It should be noted that annular mount 36 defines, in effect, a second reference axis whose angular relationship to the first reference axis defined by frame surface 14 can be changed, merely by rotating the mount within the frame 12. The vial is mounted in a fixed relationship to such second reference axis, which reference axis could be, for example, the longitudinal axis 38 of the vial.

As illustrated in FIG. 4, vial 37 is suitably mounted at its ends by a mastic or the like within the annular mount 36 between sets of detecting arrangements for sensing the presence or absence of fluid within the vial at their location. Each of the detecting or, in other words, sensing arrangements includes a light emitting diode 39 and a phototransistor 41 adjacent opposite side walls of the vial, the diodes and phototransistors of the separate sets being distinguished from one another by use of primed reference numerals. Diodes, 39' emit optical radiation in, for example, the infrared range, and direct the same through the vial 37 to their associated phototransistors 41'. As can be seen, each of the sensing arrangements is positioned to direct radiation through the vial inwardly adjacent an associated edge of the vial bubble 42 when the bubble is located centrally within the vial consistent with a vial level condition. When the vial is not level in the direction of its longitudinal axis 38, however, bubble 42 will move therein in view of the action of gravity on the liquid within the vial. The result will be that the path of radiation defined by one set of the sensing arrangements will be intercepted by liquid within the vial, with the consequence that the vial will absorb a greater percentage of such radiation than before. As will be discussed in more detail hereinafter, a logic comparison circuit is provided to detect any difference in the electrical output of the phototransistors indicative of the positioning of the bubble in the vial.

The liquid within the vial 37 defining the bubble 42 is most desirably selected not only to satisfy the criteria for the bubble discussed below, but also to provide adequate absorption of the optical radiation which is used. It has been found that methyl alcohol (methanol) containing a small percentage of a dye, such as bluing, will provide satisfactory results when the optical radiation is within the infrared range of the spectrum.

As mentioned previously, the configurations of the vial 37 and the bubble 42 assure that instrument 11 is reliable and capable of field use without the likelihood of false readings and the like. With reference to FIGS. 5, 6 and 7, it will be seen that the vial is elongate and has an inner peripheral surface configuration which is generally rectangular in cross section. That is, the vial includes generally parallel opposed side walls 43 and 44 connected by top and bottom walls 45 and 46. The interior surfaces of the opposed side walls 43 and 44 and of the top wall 45 are flat. In this connection, the interior surface of top wall 45 is orthogonally related to the interior surfaces of the opposed side walls.

The dimensions of the bubble relative to the distance between the side walls of the vial is important. In this connection, a bubble defined by liquid and constrained only beneath a flat horizontal surface can be said to have a "natural" diameter, i.e., the diameter of the circular periphery of the bubble formed at the location such a bubble interfaces with the horizontal surface against which it is pressed by the liquid. For best results in accordance with the following discussion, the liquid and the bubble in the vial are such that if the bubble were not constrained by sidewalls 43, 44 and were constrained only by a top horizontal surface, it should have a natural diameter at least three times the distance between the opposed side walls 43, 44 of the vial.

It has been found that if the above criteria are met and capillary action of the liquid within the vial is negligible, a vial inclination sensor is obtained which is usable quite satisfactorily in an electrically responsive leveling instrument. The bubble within the vial will have a side configuration essentially the same as that depicted in FIG. 5. It is to be noted from FIG. 6 that the opposed sides of the bubble are defined almost exclusively by the vial side walls 43, 44. The ends 47 and 47' of the bubble defined by the liquid within the vial therefore will generally be vertical, i.e., be generally parallel to the lines of the gravity field. The bubble ends 47, 47' will not, of course, be truly vertical but will be somewhat rounded due to the physical law requirement that the interface area between the gas defining the bubble and the liquid be at a minimum, as well as because of the liquid's cohesive force and adhesive forces acting between the liquid and the vial material.

Because substantially all of each opposed side of the bubble is defined by a vial side wall and the ends of the bubble extend generally vertical, i.e., parallel to the lines of the gravity field, changes in the position of the bubble due to limited rotation of the vial about its longitudinal axis 38, i.e., any error generated by tipping of the leveling instrument in a direction orthogonal to the direction whose inclination is to be measured, will be minimized. In this connection, reference is made to FIGS. 6 and 7 which depict the relationship of the sensing arrangement to the bubble depicted in FIG. 5 under differing conditions of operation. It is to be noted that the bottom surface 48 of the bubble is generally flat (as contrasted, for example, with a bubble in a vial having a circular cross section), and that the sensing arrangement, including the detectors 41, is positioned a substantial distance above the bubble bottom portion. In view of this, it will be seen from FIG. 7 that when the vial is tipped to its side (inclined in a direction orthogonal to its longitudinal axis) a limited extent, e.g., 20°, the liquid within the vial still will not interfere with direct line-of-sight between the lamp 39 and the detector 41. And since the ends 47,47' of the bubble immediately adjacent to the paths 80, 81 of optical radiation are generally vertical, the liquid at the side of the bubble also will not intercept such optical radiation assuming, of course, that the vial is not also inclined in the direction of its longitudinal axis.

It should be noted that there is a tendency for some change in the overall configuration of the bubble when the vial is tipped as shown in FIG. 7, even when the above criteria are met. The configuration changes can be minimized by reducing, to the extent consistent with good bubble movement within the vial, the distance between the opposed side walls 43 and 44 relative to the size of the bubble. It has been found that when the size of the bubble is selected to have a natural diameter which is at least three times the width of the vial as discussed previously, the bubble configuration change is so slight for a 20° rotation of the vial about its longitudinal axis that the error induced due to the configuration change is negligible. In this connection, with proper selection of liquid and vial material, the floor of the bubble does not become truly horizontal in spite of the tipping in view of adhesive forces acting between the liquid and vial side walls, and the cohesive forces acting within the liquid.

The degree to which the distance between the vial side walls can be minimized, however, is limited by the necessity of free bubble movement. As is known, adhesive force between the liquid and vial material can affect bubble movement. It has been found that when the vial is glass and the liquid is methanol, or a similar liquid having a surface tension of about 22 dynes per cm. at room temperature, a satisfactory arrangement is obtained when the distance between the opposed walls of the vial is about $\frac{1}{8}$ inch (3.18 mm.). It has also been found by experimentation that when the width between the opposed side walls (same vial material and liquid) was reduced to 1/16 inch (1.6 mm.), the attractive forces between the liquid and vial material were sufficiently great to make movement of the bubble relatively sluggish. When the width was increased to ¼ inch (6.35 mm.), configuration changes of the bubble upon tipping of the vial to its side resulted in less accuracy than desired. In all cases, the bubble 42 was made up of the naturally prevailing atmospheric gases at atmospheric pressure, as modified by vapor from the liquid present within the vial.

It is important to assure that the configurational changes do not occur t the bubble upon movement of the bubble within the vial in the direction of the inclination being measured. Specifically, the configuration of the internal surface area of the vial should be generally the same for the full length of the vial along which it is expected the bubble will travel during use of the instrument. To this end, the side walls of the preferred embodiment are flat for the full length of bubble travel. The interior surface of the top wall 45, however, is not exactly flat. Rather, it is slightly curved along the length of the vial, as can be seen from FIG. 5. This slight curvature improves response time and aids in defining a specific location for the bubble for any particular inclination. That is, the tendency of the bubble to "hunt" for a location at the slightest movement of the vial will be reduced, with the result that more reliable readings can be obtained.

Figure 8:
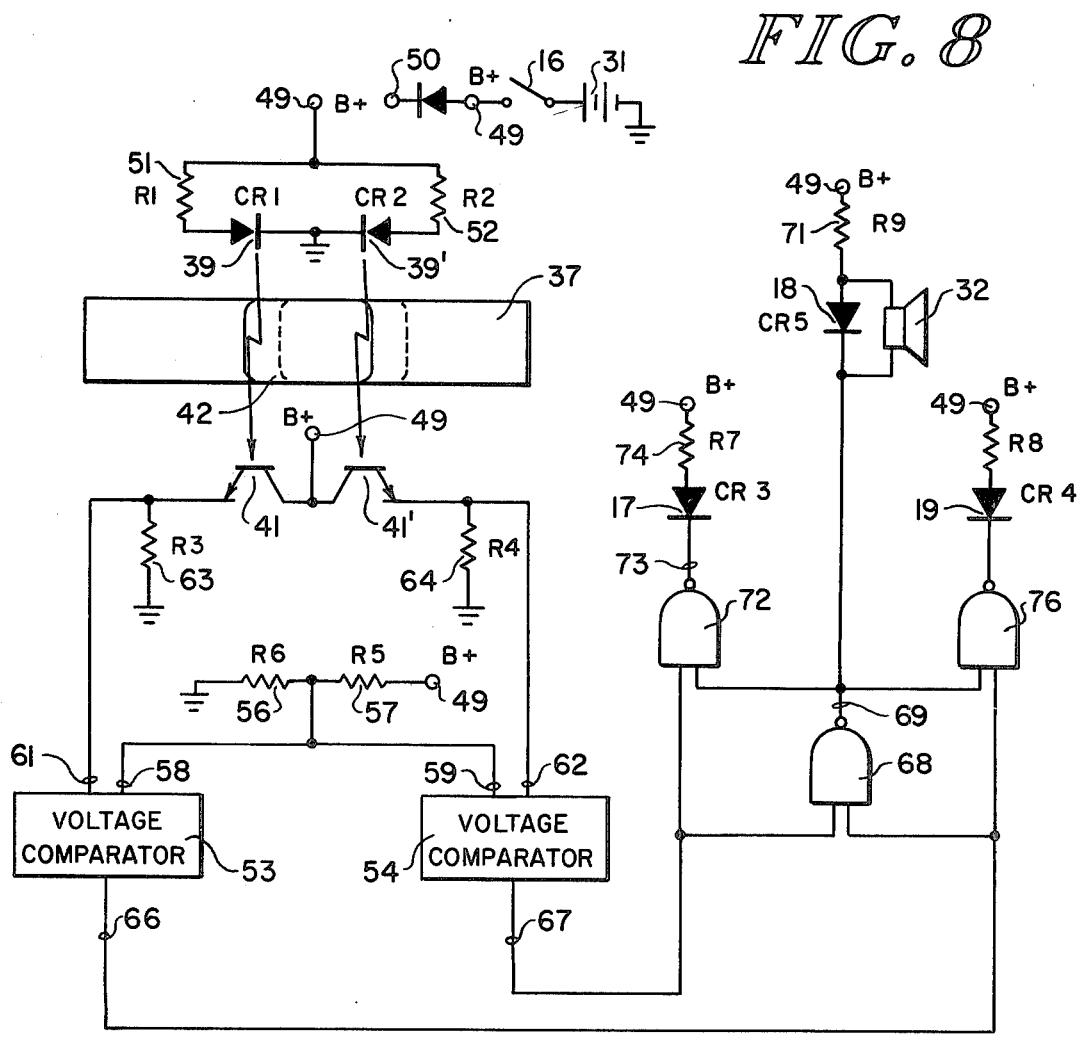
FIG. 8 is a schematic view of the vial and the logic circuitry incorporated in the electronic level of FIG. 1 to provide an electrical response to changes in the location of the bubble within the vial.

As mentioned previously, logic circuitry is provided which is especially designed to cooperate with the vial and bubble configuration discussed above to provide a leveling instrument having the reliability and accuracy required for wide adoption. FIG. 8 is an electrical schematic diagram of such circuitry. Battery packages 31 is represented as a voltage source connected between ground and one terminal of ON-OFF switch 16. As illustrated, when switch 16 is in the ON position, the battery package will supply a positive voltage to node 49 and also a lesser positive voltage to node 50 to deliver rated supply voltage to the NAND gates to be described.

The application of voltage to node 49 will cause energization of the light emitting diodes 39 and 39' ($CR_1$ and $CR_2$). That is, such voltage will be explained via current limiting resistors 51 and 52 ($R_1$ and $R_2$) to ground through respective diodes 39 and 39'. The resulting optical radiation will pass through the vial 37 to be received by the phototransistors 41 and 41' associated, respectively, with the diodes 39 and 39'.

The voltage applied to node 49 is also applied to the phototransistors 41 and 41'. As is known, the conductance through such phototransistors will be dependent upon the amount of optical radiation received by each. A pair of voltage comparators 53 and 54 are electrically connected to the outputs of each of the transistors to compare such outputs with a reference voltage. Such reference voltage is provided by a voltage dividing network made up of a pair of resistors 56 and 57 connected between node 49 and ground. It is simultaneously directed to one of the input terminals 58 and 59 of each of the comparators 53 and 54. The other input terminals 61 and 62 of such comparators are respectively connected to the outputs of phototransistors 41 and 41'. Emitter load resistances 63 and 64 are also respectively connected between each of such phototransistor outputs and ground.

A logic tree is provided reactive to the voltage states on the comparator output terminals 66 and 67 to energize the display lamps and audio device accordingly. In this connection, the voltage state appearing at the output terminal of each of the comparators is dependent upon the relationship of the voltage states applied to its two input terminals. That is, each of such comparators is selected in this specific circuitry to have a high voltage level output when the input voltage from its associated phototransistor exceeds the reference voltage. If required by the specific circuitry chosen, pull-up resistances and oscillation inhibiting capacitances can also be connected to the outputs of the comparators.

When the vial is in a vial level condition, the amount of optical radiation received by the respective phototransistors 41 and 41' will generally be the same. The parameters of the circuitry are selected so that the resulting voltage applied to the respective input terminals 61 and 62 of the two comparators will be slightly greater than the reference voltage applied to the terminals 58 and 59. The resulting high states on the output terminals 66 and 67 of the comparators are fed to the input terminals of a NAND gate 68. The output of such NAND gate at node 69 will thus go low, with the result that current from the positive voltage supply at node 49 can be conducted via limited resistor 71 ($R_9$) through both light emitting diode 18 ($CR_5$) and audio device 32. These display devices will thus indicate a "vial level" condition.

When the vial 37 is inclined as viewed in FIG. 8 by lowering its left end (moving the same into the paper), bubble 42 will move to the right in the vial as shown in dotted lines. The result will be that the optical radiation being recevied by phototransistor 41 will be reduced in intensity and the output thereof will correspondingly decrease. The parameters of the circuitry are selected to assure that the voltage decrease will be to a voltage below the voltage provided to the comparator input terminal 58 from the reference voltage. The voltage state at output terminal 66 of such comparator will therefore become low, with the result that two different voltage states will be applied to the two input terminals of NAND gate 68. Its output will therefore go high and block the passage of current from node 49 through the diode 18 and audio device 32. Such high state, however, will be fed to one of the input terminals of NAND gate 72. The other input terminal of such NAND gate is connected to the output terminal 67 of comparator 54. Such output terminal will continue to be at a high state since the direction of movement of the bubble 42 in the vial does not result in liquid interfering with full transmission of optical radiation between diode 39' and phototransistor 41'. Thus, both input terminals of NAND gate 72 will be high, with the result that its output terminal 73 will go low resulting in a current flow through limiting resistor 74 and diode 17 ($CR_3$). The energization of such diode will provide a visual display indicating that the end of the instrument with which it is most closely associated is higher than the other end.

When diode 17 is energized by operation of NAND gate 72, NAND gate 76 will prevent energization of diode 19 ($CR_4$). That is, while the input terminal of NAND gate 76 connected to the output of gate 68 will be at a high state, its other input terminal, connected to output terminal 66 of comparator 53, will be low. Thus, the output terminal of such gate will remain high and block passage of current through diode 19.

It will be recognized that when the vial is inclined in the opposite direction, i.e., its lefthand side as viewed in FIG. 8 is higher than its righthand side, diode 19 will be energized while diodes 17 and 18 will not. The differing states applied to the two input terminals of the center NAND gate 68 will prevent energization of the diode 18 with which it is associated. Differing states will also be applied to the input terminals of NAND gate 72, which will likewise prevent energization of its associated light emitting diode 17. However, high states will be applied to both of the input terminals of NAND gate 76, with the result that its output terminal will go low and provide a voltage drop across light emitting diode 19 to energize the same. It should be recognized the logic circuitry thus described provides an electrical interlocking action which prevents simultaneous turn-on of any two indicating light emitting diodes, thus preventing ambiguous indications.

In one specific embodiment of the circuitry, the various circuit components were of the following types and values:

| | | |
|---|---|---|
| B+ Voltage | 6 Volts (4 Dry Cells) | |
| Light Emitting Diodes | CR1 | Monsanto Type ME 7124 (infrared) |
| | CR2 | Monsanto Type ME 7124 (infrared) |
| | CR3 | Monsanto Type MV 5054 (red) |
| | CR4 | Monsanto Type MV 5054 (red) |
| | CR5 | Monsanto Type MV 5252 (green) |
| Phototransistors | Q1 | Monsanto Type MT2 |
| | Q2 | Monsanto Type MT2 |
| Resistors | R1 | Carbon Composition 820 Ohms ±5% |
| | R2 | Carbon Composition 820 Ohms ±5% |
| | R3 | Carbon Composition 15000 Ohms ±5% |
| | R4 | Carbon Composition 15000 Ohms ±5% |
| | R5 | Metal Film 5110 Ohms ±1% |
| | R6 | Metal Film 5110 Ohms ±1% |
| | R7 | Carbon Composition 200 Ohms ±5% |
| | R8 | Carbon Composition 200 Ohms ±5% |
| | R9 | Carbon Composition 200 Ohms ±5% |
| Audio Device (Solid State) | 32 | Mallory Type SNP428 |
| NAND Gates | 68 | National Semiconductor Type DM7438 |
| | 72 | National Semiconductor Type DM7438 |
| | 76 | National Semiconductor Type DM7438 |
| Voltage Comparators | 53 | National Semiconductor Type LM211 |
| | 54 | National Semiconductor Type LM211 |

Although the best mode contemplated by the inventors of carrying out the invention has been described quite specifically in accordance with the Patent Statutes, it will be appreciated by those skilled in the art that various changes and modifications can be made without departing from the spirit of the invention. For example, while the configuration of the vial and bubble therewithin is described in detail in connection with a carpenter's level, it will be recognized that the invention is applicable to any leveling instrument from which it is desired there by an electrical response to inclination. It is therefore intended that the coverage afforded applicant be limited only by the claims and their equivalent language.

We claim:

1. An instrument for responding electrically to inclinations with respect to a gravity field, comprising:
    first means defining a first reference axis whose inclination with respect to a gravity field is to be determined;
    a vial having interior walls defining a chamber elongated in the direction of a longitudinal axis of the vial;
    said vial being mounted in a fixed orientation with respect to said first reference axis so that said first reference axis and said longitudinal axis lie in a common plane;
    a liquid and a bubble being confined within said chamber so that said bubble is free to move in the direction of said longitudinal axis within said chamber according to the inclination of said longitudinal axis with respect to the gravity field;
    said vial chamber being convex upwardly, with respect to said gravity field, so that when said longitudinal axis is perpendicular to the gravity field, the bubble will be in a zero inclination position within said chamber;
    when in the zero inclination position, said bubble, liquid, and vial define a liquid-bubble interface surface, a liquid-vial interior wall interface surface, and a bubble-vial interior wall interface surface;
    sensing means passing a beam of radiation through said bubble in said zero inclination position, said sensing means receiving at least a portion of said beam of radiation from said bubble with said bubble in the zero inclination position and for producing an electric signal correlated to the radiation received so that the electric signal will vary whenever said bubble moves from its zero inclination position in the direction of said longitudinal axis;
    display means receiving said electrical signal and producing a correlated display indicating the orientation of said vial relative to the gravitational field as measured within said common plane;
    said beam of light having a fixed orientation with respect to said vial and vial longitudinal axis so that the rotation of said vial about said longitudinal axis, said beam and sensing means will correspondingly rotate about said longitudinal axis;
    as seen in a plane perpendicular to said longitudinal axis and containing at least a portion of said beam between said sensing means and said bubble, said vial including means confining said bubble in its zero inclination position so that at least that portion of the beam from said sensing means to said bubble will only optically strike the bubble-vial interior wall interface surface exclusive of the liquid vial interior wall surface throughout an angular range of rotation of said vial and sensing means about said longitudinal axis of 20°, in either direction, from the vertical orientation of said common plane relative to the gravity field so that there will be no substantial change in the electrical signal; and
    when said bubble is in said zero inclination position and said common plane is vertical with respect to the gravity field, the distance between opposed side walls of said vial having said bubble-vial interior wall interface surfaces, as measured along the beam path through said bubble, is no greater than one-third the natural bubble diameter that would result if said bubble were in said liquid and only confined by a top planar surface of the same material as said vial interior walls so as to provide a generally flat bubble end portion of said liquid bubble interface generally perpendicular to said longitudinal axis immediately adjacent said beam.

2. An instrument for responding electrically to inclinations with respect to a gravity field according to claim 1 wherein the configuration of the internal surface area of said vial defining the shape of said bubble therein is generally the same for the full length of said vial along which it is expected said bubble will travel during use of said electrically operated instrument.

3. An instrument for responding electrically to inclinations with respect to a gravity field according to claim 2 wherein the interior surfaces of said side walls are generally flat.

4. An instrument for responding electrically to inclinations with respect to a gravity field according to claim 3 wherein the interior surfaces of said opposed side walls are generally parallel to one another and said side walls are connected together by a top wall having a generally flat interior surface orthogonally related to the interior surfaces of said opposed side walls.

5. An electrically operated instrument for responding electrically to inclinations with respect to a gravity field according to claim 2 further including second means defining a second reference axis, which second means is mounted for rotation with respect to said first means to change in a common plane the angular orientation of said second reference axis to said first reference axis; and wherein said vial is mounted on said second means in a fixed relationship to said second reference axis.

6. An electrically operated instrument for responding electrically to inclinations with respect to a gravity field according to claim 5 further including indicia on at least one of said first and second means for visually displaying the angular relationship at any given time of said first reference axis to said second reference axis.

7. An electrically operated instrument for responding electrically to inclinations with respect to a gravity field according to claim 5 wherein the interior surfaces of said side walls are generally flat.

8. An instrument for responding electrically to inclinations with respect to a gravity field according to claim 2 wherein the bottom surface of said bubble is defined by liquid and is generally flat, and said sensing means includes a pair of detectors for intercepting optical radiation transmitted through said vial, which detectors are positioned adjacent one of said side walls of said vial spaced a substantial distance above said bubble bottom surface to intercept radiation transmitted through said vial respectively adjacent said ends of said bubble.

9. An instrument for responding electrically to inclinations with respect to a gravity field according to claim 8 wherein each of said detectors is a phototransistor reactive to optical radiation and is associated with light emitting diode adjacent the opposite one of said side walls to direct radiation through said vial toward its associated phototransistor, and circuit means are provided to detect a difference in electrical output of said phototransistors indicative of the positioning of said bubble in said vial relative to said phototransistors.

10. An electrically operated instrument for responding electrically to inclinations with respect to a gravity field according to claim 9 wherein said circuit means comprises:
   a source of reference voltage;
   a first voltage comparator electrically connected to said reference voltage and a first one of said phototransistors to detect differences in voltage therebetween;
   a second voltage comparator electrically connected to said reference voltage and to a second one of said phototransistors to detect differences in voltage therebetween;
   a logic circuit connected to the output of said first and second voltage comparators to sense the relationship of the states of the outputs of said voltage comparators; and
   means to feed the output of said logic circuit to said display means.

11. An instrument for responding electrically to inclinations with respect to a gravity field according to claim 1 wherein the liquid within said vial has a surface tension of about 22 dynes per cm. at room temperature, and the distance between said opposed sides of said vial is about 3.18 mm.

* * * * *